United States Patent Office 3,271,436
Patented Sept. 6, 1966

3,271,436
PROCESS FOR THE PRODUCTION OF HETEROCYCLIC BORON COMPOUNDS
Roland Koster, Mulheim (Ruhr), Germany, assignor to Studiengesellschaft Kohle m.b.H., Mulheim (Ruhr), Germany, a corporation of Germany
No Drawing. Filed Feb. 10, 1961, Ser. No. 88,248
Claims priority, application Germany, Feb. 13, 1960, St 16,117
2 Claims. (Cl. 260—462)

This invention is concerned with heterocyclic boron compounds and with a process for the production thereof. It is more particularly concerned with the production of heterocyclic boron compounds having the structural grouping

in which R represents an unbranched or branched bifunctional aliphatic hydrocarbon radical.

The present invention provides a process for the production of heterocyclic boron compounds containing the group

in which R represents an unbranched or branched bifunctional aliphatic hydrocarbon radical, which comprises heating a compound of the general formula $BH_xR_y^1X_z$ (in which $x+y+z=3$, $x=1$ or 2 and $z=0$ or 1, $R^1$ is an aliphatic hydrocarbon radical with at least four carbon atoms in an unbranched part of the hydrocarbon chain and X represents $R^2$, $OR^2$ or $NR_2^2$, wherein $R^2$ represents an aliphatic, cycloaliphatic or aromatic hydrocarbon radical and may be the same as, or different from, the group $R^1$) or a mixture of boron compounds equivalent thereto, to a temperature at which evolution of hydrogen occurs.

Mixtures of boron compounds which are equivalent to the compounds of the general formula $BH_xR_y^1X_z$ and which may be used in the process according to the invention include in particular mixtures conforming to the general formula $xBH_3+yBR_3^1+zBX_3$ in which $x$, $y$, $z$ and $R^1$ and X have the meanings given above.

The starting compounds or mixtures described above split off molecular hydrogen on being heated, more especially at temperatures above 150° C., and so that heterocyclic boron compounds are formed. The following equation shows the principle of the process according to the invention:

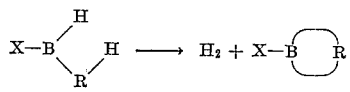

Especially suitable for the process according to the invention are alkyl diboranes of the general formula $(BH_xR_y^1)_2$, that is compounds of the formula $BH_xR_y^1X_z$, in which $z=0$. Preferred mixtures of boron compounds which may be used for the process according to the invention include mixtures of N-trialkyl-borazanes $$(BH_3 \cdot NR_3^1)$$

which contain the $BH_3$ component of the aforementioned reaction mixture in stabilised form, with boron trialkyls ($BR_3^1$) or also alkyl boric acid esters $R_x^1B(OR^1)_y$ ($x+y=3$, $x=1$ or 2). Thus, from tetra-n-butyldiborane $B_2H_2(n-C_4H_9)_4$, for example, butyl borolanes are obtained in a yield higher than 90% by dehydrogenation according to the following equation:

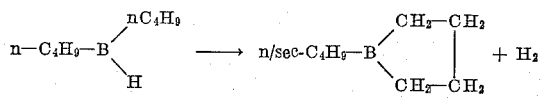

In the presence of N-trisubstituted borazanes, the reaction according to the invention proceeds for example as follows:

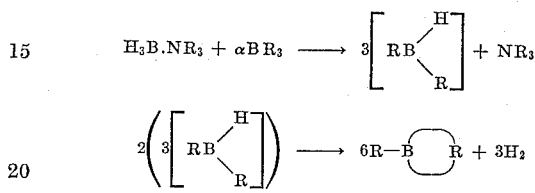

Boron heterocyclic compounds with 5-membered, 6-membered and 7-membered rings can in particular be prepared by the process according to the invention. Depending on the length of the alkyl radical linked to the boron atom which reacts during the dehydrogenation, compounds of the following formulae are for example formed in the reaction mixture:

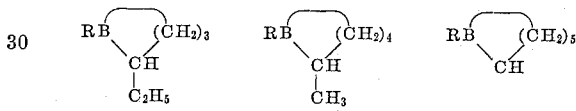

At a temperature above 150° C., these ring compounds are transformed into one another. For example, on heating a mixture of different B-alkyl-borocyclanes with at least 6 carbon atoms in an alkyl chain, the corresponding B-alkyl borocyclohexane is formed in admixture with the 5-membered and 7-membered ring compounds.

It is preferred to employ solvents, in particular saturated aliphatic hydrocarbons, in the process according to the invention, although it may be effected in the absence of solvents. In particular an excess of boron alkyls may be used as solvent since they promote the dehydrogenation reaction and in addition can easily be separated, for example by distillation, from the boron heterocyclic compounds produced.

When boric acid esters are used in the process according to the invention, there are obtained boron heterocyclic compounds of the general formula

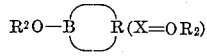

When boric acid dialkyl amides having the characteristic group $B-NR_2^2$ are used for example compounds result of the following formula

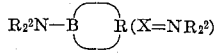

These compounds are also formed in minor quantities, when N-trialkyl borazanes are employed.

The cyclic boron compounds prepared according to the invention are suitable as intermediates in the synthesis of organic compounds. For example the corresponding alkane-diols may be readily produced from the boron heterocyclic compounds by oxidation and subsequent hydrolysis. Alkane-diols can in this way be prepared from monoolefines when using the reaction according to the invention.

In order that the invention may be further understood, the following examples are given by way of illustration only:

Example 1

A total of 30 g. of N-triethyl borazane is slowly added dropwise in the absence of air and moisture to 266 g. of thoroughly stirred boron tri-(methylpentyl) heated to 210–220° C. Hydrogen is constantly evolved and the amine which is liberated (25 g.) is distilled off. 134 g. of B-isohexyl borocyclanes (B.P.$_{16}$=101–102° C.) are then obtained by distillation under reduced pressure. The mixture consists of approximately 15% of isohexyl (C-methyl borocyclopentanes) and approximately 85% of isohexyl borocyclohexane. In addition, 125 g. of boron tri-(methylpentyl) are recovered: practically no residue is left. The yield of the cyclic boron compounds is thus 85%. In addition, small quantities (about 3 g.) of B-diethylaminoborocyclane are obtained.

Example 2

A mixture of 8.5 g. of N-triethylborazane and 27.4 g. of boron tri-n-butyl is heated to 190° C. Hydrogen is evolved and 6.2 g. of amine distills off. On distillation, there are obtained 8 g. of butyl borolanes (B.P.$_{14}$=54–57°) which consists of approximately 15% of sec-butyl-borolane and approximately 85% of n-butyl-borolane. 17 g. of boron tributyl are recovered. The yield of cyclic boron compounds is 75% with approximately 25% of the starting material having reacted.

Example 3

An apparatus which consists of a tube 3 cm. in width and 15 cm. in length, at the lower end of which is connected a 250 cc. two-necked flask the said tube being filled with glass rings and being adapted to be electrically heated is used in this example. A dropping device is positioned on the vertically disposed tube at about two-thirds above its lower end. The upper end of the decomposition tube is connected to a reflux condenser, to which a gas meter is connected.

A mixture of 25 g. of tetra-n-butyl diborane and 25 g. of boron tri-n-bnutyl is slowly introduced in the absence of air and moisture dropwise into the tube, which is heated to about 240–250° C. A total of 4.2 litres of hydrogen is obtained over a period of approximately 2 hours. The reaction product running down into the glass flask and fuming strongly in air because of autoxidation yields, on distillation, 21.5 g. of butyl borolanes (B.P.$_{14}$= 54–57° C., composition as in Example 2) as well as 25 g. of unreacted boron tributyl. Yield 90%.

Example 4

By following the procedure of Example 3 and using tetra-n-hexyl-diborane, dissolved in approximately the same quantity by weight of boron tri-n-hexyl, there is obtained a mixture of different B-hexylborocyclanes (B.P.$_{14}$=102–104° C.) in 85% yield. The mixture of the isomers consists of about 5% of 2-ethyl borocyclopentane, 25% of borocycloheptane and 70% of 2-methyl borocyclohexane.

Example 5

15 g. of diborane are introduced at room temperature into a mixture of 230 g. of boric acid tri-n-butyl ester and 224 g. of boron tri-(2-methylbutyl), the boron compound HB(OC$_4$H$_9$)(C$_5$H$_{11}$) being formed by exchange of substituents. The colourless liquid is heated according to the invention to 200–220° C., a total of 65 litres at N.T.P. of hydrogen being evolved. The colourless, liquid residue (420 g.) boils at 72° C. under reduced pressure (16 mm. Hg). It is the B-butoxy-3-methyl-borolane.

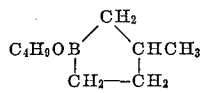

Example 6

53 g. of di-n-nonylborohydride are heated to approximately 220° C., 5.2 litres at N.T.P. of hydrogen being evolved. Distillation of the colourless mixture yields, after the first runnings (5 g. of nonenes as well as 3 g. of 8-boradecalin), 40 g. of a mixture of different B-nonyl boracyclanes. The mixture comprises three compounds (analysis by gas chromatography) of the following composition (identification by oxidation and hydrolysis over the corresponding diols) (see J. Am. Chem. Soc. 81, 5832 1959)):

80% of B-nonylbora-2-butylcyclohexane

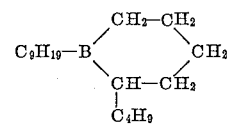

17% of B-nonyl-2-pentylboracyclopentane

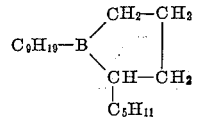

3% of B-nonyl-2-propylboracycloheptane

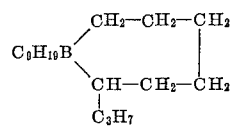

The mixture of compounds boils at 70–85° C. under reduced pressure (10$^{-3}$ mm. Hg).

Example 7

15 g. of diborane are introduced into a mixture of 220 g. of boric acid tris-(diethylamine) and 220 g. of boron tri-n-hexyl. The liquid compound

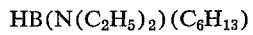

thus obtained is then heated to 200–230° C., a total of 70 litres at N.T.P. of hydrogen being evolved. The borazane mixture which is formed is then distilled (B.P.$_{12}$=102–115° C.). The composition of the mixture is as follows:

83% of B-diethylamino-2-methylboracyclohexane

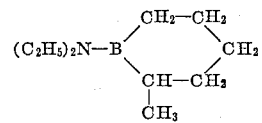

14% of B-diethylamino-2-ethylboracyclopentane

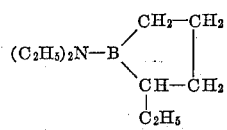

3% of B-diethylaminoboracycloheptane

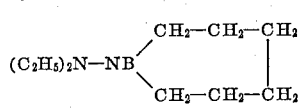

What I claim is:

1. B - butoxy - 3 - methyl-borolane having a B.P.$_{16}$ of 72° C.

2. A borazane mixture comprising B-diethylamino-2-methyl-boracyclohexane, B-diethylamino-2-ethyl-boracyclopentane and B-diethylaminoboracycloheptane and having a $B.P._{12}$ of 102–115° C.

References Cited by the Examiner

UNITED STATES PATENTS

| | | | |
|---|---|---|---|
| 2,539,871 | 1/1951 | Smedslund | 252—1 |
| 2,858,339 | 10/1958 | Clark et al. | 260—606.5 |
| 2,858,340 | 10/1958 | Clark et al. | 260—606.5 |
| 2,894,020 | 7/1959 | McManimie | 260—462 |
| 2,939,877 | 6/1960 | Washburn | 260—462 |
| 2,965,565 | 12/1960 | McDonald | 252—1 |

OTHER REFERENCES

Koster, Angew. Chem., vol. 71, 1959, pages 520, QDL Z5.

Winternitz, Amer. Chem. Soc., abstracts of papers, 135th meeting, 1959, page 19M.

Zeiss, Organometallic Chemistry, Reinhold Publishing Corp., N.Y., 1960, page 172, QD 411 Z4C. 4.

TOBIAS E. LEVOW, *Primary Examiner.*

LEON D. ROSDOL, OSCAR R. VERTIZ, *Examiners.*

L. A. SEBASTIAN, F. R. OWENS, W. F. W. BELLAMY, *Assistant Examiners.*